United States Patent [19]

Plant, II

[11] 3,788,159

[45] Jan. 29, 1974

[54] RACK AND PINION STEERING GEAR

[75] Inventor: Ernest M. Plant, II, Frankenmuth, Mich.

[73] Assignee: General Motors Corporation, Detroit, Mich.

[22] Filed: Oct. 30, 1972

[21] Appl. No.: 301,869

[52] U.S. Cl. .................................... 74/422, 74/498
[51] Int. Cl. .......................... F16h 1/04, B62d 1/20
[58] Field of Search ................ 74/388 PS, 422, 498

[56] References Cited
UNITED STATES PATENTS
3,352,170 11/1967 Adams........................... 74/388 PS
3,623,379 11/1971 Bradshaw et al. .................... 74/498

Primary Examiner—Leonard H. Gerin
Attorney, Agent, or Firm—D. L. Ellis

[57] ABSTRACT

A rack and pinion steering gear for automotive vehicles and the like includes a relatively short pinion housing, an elongated rack guide tube received within a somewhat overlarge longitudinal bore of the pinion housing and which in turn receives a reciprocable rack member meshingly engaged by a pinion on a pinion shaft mounted in a cross bore of the pinion housing, with the rack guide tube being adjustable positionally within the overlarge housing bore in directions radially, axially and tiltably therewithin to effect proper sdjustments of the mesh of the rack and pinion and the preload therebetween.

8 Claims, 4 Drawing Figures

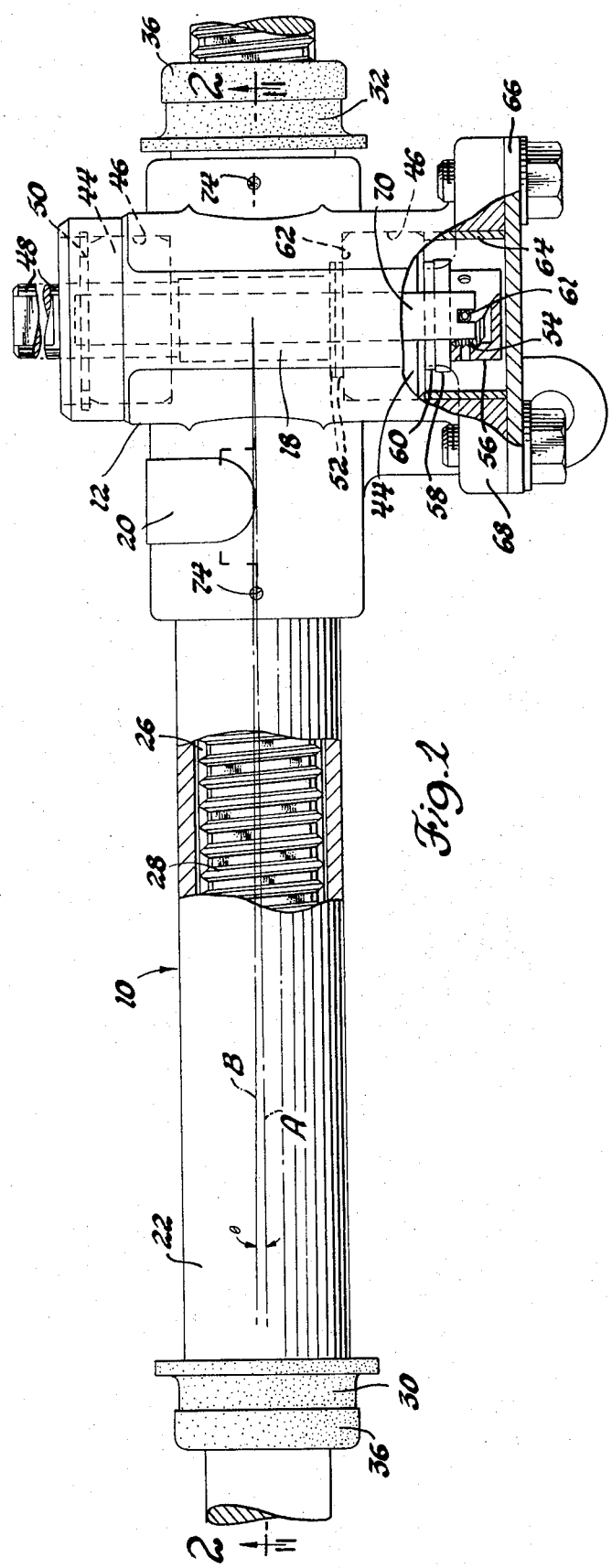

RACK AND PINION STEERING GEAR

This invention relates to steering gears and more particularly to an improved rack and pinion type of steering gear for automotive vehicles.

The principal feature of this invention is that it provides an improved rack and pinion steering gear for automotive vehicles and the like embodying structural features adapted to an economical yet precision adjustment of proper meshing engagement between the rack and pinion parts thereof during assembly.

Another feature of the invention is that the foregoing is accomplished with the aid of in situ injection molding of retaining structure between adjustable parts of the rack and pinion gear.

In its more specific aspects, the invention features the provision of a pinion housing of relatively short length fitted with a rack guide tube receivable in a somewhat overlarge longitudinal bore of the pinion housing, the rack guide tube being adjustable in relationship to the housing in directions axially, radially and tiltably within the latter so as to effect proper mesh of the rack and pinion as well as proper preload therebetween and proper location of the movable parts of the gear in a centered condition affording generally precisely equal travel of such parts in either direction from centered condition.

The foregoing and other features and advantages of the invention will be readily apparent from the following specification and from the drawings wherein:

FIG. 1 is a partially broken away plan view of a rack and pinion steering gear assembly according to this invention;

FIG. 2 is a sectional view taken generally along the plane indicated by lines 2—2 of FIG. 1;

Figure 3:
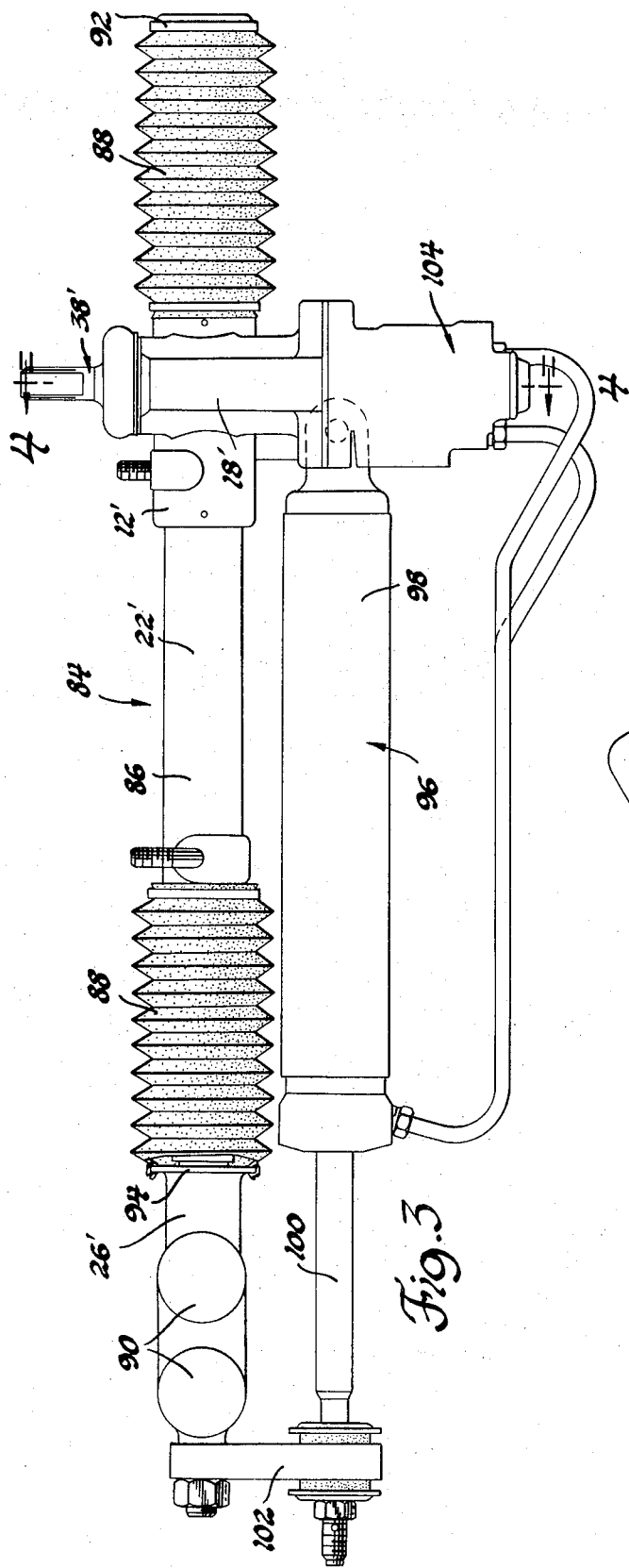
FIG. 3 is a view similar to FIG. 1 showing a modification of the invention adapted to fluid power operation.

Referring particularly to FIGS. 1 and 2 of the drawings, illustrated there is a manual version of a rack and pinion steering gear assembly according to this invention and indicated generally by the reference numeral 10. The gear assembly 10 includes a pinion housing 12 of forged, cast or like construction and of a relatively short configuration. Defined within housing 12 is a longitudinal rack bore 14 and, in a plane orthogonal to the plane of the rack bore 14, a cross bore 16 having its axis elevated with respect to the axis of rack bore 14 and necessitating a humped portion 18 in the gear pinion housing 12. Integral bosses such as at 20 are provided for boring and tapping therein to receive threaded fasteners for attachment of the housing 12 to the vehicle frame or otherwise, A rack guide tube of elongated configuration, indicated at 22, is received within and extends completely through rack bore 14. As indicated in the drawings, the diameter of rack bore 14 is somewhat enlarged with respect to the selected outer diameter of tube 22 for reasons that will later appear. As indicated in FIG. 2, a relief or cutout 24 is provided in the wall of tube 22 in the region thereof adjacent the cross bore 16 for reception of a pinion and pinion shaft assembly. A rack 26 is received for relatively free sliding movement within the tube 22, such rack member including a set of rack teeth 28 of the helical variety. Bushings 30 and 32 are received at either end of rack tube 22 and support the rack therewithin for sliding movement without substantial friction. These bushings may be fabricated of a suitable tough plastic material such as Teflon-impregnated Delrin. The bushings are fabricated in a special reentrantly annularly folded configuration so as to snap-fittingly engage and retain itself on serrations 34 on the terminal ends of tube 22, like serrations being formed on the inside wall of the outer annulus of each bushing 30 and 32. A bumper ring 36, again of a durable plastic material or the like, is squeezed over the end of each bushing 30 and 32.

The gear assembly 10 further comprises a pinion and pinion shaft subassembly 38 within cross bore 16 and which includes a pinion 40 adapted for proper meshing engagement of its helical teeth 42 with rack teeth 28. The pinion is preferably formed integrally with reduced diameter shaft ends or shanks either side thereof constituting a single shaft. Referring to the broken lines and the partially broken away portion of FIG. 1, there is located adjacent either end of such pinion 40 a pinion bushing 44 received in enlarged counterbores 46 of humped portion 18 of the pinion housing and which in turn journal the reduced diameter shaft end portion of the shaft upon which pinion 40 is formed. Again, such bushings may be fabricated from one of the tough plastic polymeric materials. A splined input end 48 of such shaft extends from one end of the cross bore 16 for suitable connection with a steering column steering shaft or other manually rotatable element as well-understood in the art. A conventional snap ring 50 retains the adjacent one of the bushings 44 within humped portion 18 against a shoulder of its counterbore 46. Adjacent the other bushing 44, a pair of hardened steel races or washters 52 are interposed over the reduced diameter shaft end between pinion 40 and such bushing, and the terminal end of such shaft end indicated at 54 is threaded to be received within a like-internally-threaded cap 56 which has an annular flange 58 bearing against a further hardened race or washer 60 abutting with the other side of the adjacent bushing 44. Thus, suitable threading adjustment of cap 56 will thrust-load this pinion and pinion shaft element against this bushing eliminating end play. A roll pin 61 is inserted within aligned bores of the cap and such shaft end in conventional manner to hold the adjustment. The bushing 44, in turn, is abutted against an annular shoulder 62 of humped portion 18 at counterbore 46 under the pressure of a retention sleeve 64 borne at its other end by a cover 66 over cross bore 16 bolted to a flange 68 of the humped portion 18.

A flat or blade type of preload spring 70 is located within a channel 72 of humped portion 18, and, as seen in FIG. 1, bears at its two ends against sides of the bushings 44. As indicated in FIG. 2, and perhaps more clearly in FIG. 4 in connection with another similar gear assembly, spring 70 is bowed convexedly to seat generally midway its length firmly against housing 12 and room is permitted for flexure of such spring at its ends about its midportion to stress the spring as a result of radially displacing the bushings in the overlarge-sized counterbores 46. This is achieved by, as viewed in FIG. 2, bodily vertically displacement of the meshed rack and pinion subassembly, along with rack tube 22 in the rack bore 14, until a desired amount of radial force or preload is present between rack teeth 28 and pinion teeth 42.

Referring now most particularly to FIG. 2, as there indicated, this vertical preloading displacement, in connection with one feature, is achieved by making longitudinal rack bore 14 of housing 12 predeterminedly larger in diameter than the outer diameter of tube 22. The predetermined difference therebetween is selected with reference to the amount (a) of radial displacement required to achieve preloading pressure of desired value in spring 70 and between teeth 28 and 42, and (b) the amount of tiltable adjustment which may be necessary to perfectly align the flanks of the rack teeth 28 with those of pinion teeth 42. The radial displacement of the pinion subassembly 38 as by the upward displacement of the rack previously described is believed apparent. It replaces more costly and complex methods of tooth preload such as by adjustable threaded plugs between the rack and rack housing with or without springs. The tiltable adjustment referred to is that adjustment indicated with reference to FIG. 1, wherein, assuming an axis of the longitudinal rack bore 14 indicated by A, some slight angular misalignment between it and the axis of rack 26, indicated at B, is necessary to achieve flush or uniform engagement of the flanks of the helical teeth 42 and 28 of the pinion and rack. Such need for misalignment can very often be the case due to the expected variations, as in lead angle or tooth helix, that can occur in the fabrication of the pinion and rack as separate parts on separate machinery. Thus, where such variations are present, it can be readily accommodated by a tiltable or skewing adjustment between the symmetrical planes of the rack tube 22 and of rack 26 through its teeth to some angle such as indicated at $\theta$ in FIG. 1.

In the case of a present constructed embodiment of the illustrated gear assembly 10, where the outer diameter of tube 22 is 1.25 inches nominally, a total clearance between that and the rack bore of 0.044 inches will accomplish the required range of radial and tiltable adjustment indicated. The radial adjustment is, of course, dependent on the rate of the spring 70 and the amount of wear between the teeth of the parts and in the bushings 32 expected to occur over a period of use.

Once having accomplished the desired adjustments mentioned above, they may be held by in situ injection molding of retaining structure between the housing 12 and the rack guide tube 22. As seen best in FIG. 2, housing 12 is provided adjacent either end with passage means including a circumferential series of radially extending apertures 74 opening to an annular groove 76 communicating with rack bore 14. Juxtaposed to such grooves 76 are complementary grooves 78 formed annularly within the outer surface of tube 22. Juxtaposed as they are, grooves 76 and 78 form annuli or cavities extending around tube 22 which receives under injection pressure a quantity of curable plastic material 80, such as nylon, which, when cured, form retaining rings. Thus, once having fixed the relationship between tube 22 and housing 12 as above, injection molding of plastic 80 into these grooves and subsequent curing thereof as part of the manufacturing process forms an economical and highly efficient permanent retention of the adjusted relationships mentioned suitable for long periods of use and rugged duty. It will also be observed that with the amount of gap present around the periphery of tube 22 inside housing 12, the passage means referred to may also include certain portions of the annular interspace therebetween, as shown, to the extent that such is allowed given the pressure of injection of plastic therewithin, thereby advantageously to contribute to permanent retention of the relationship of the parts. Such plastic flow into and around the interspace can be confined to regions outside cross bore 16 by use of sealing rings 82, shown in FIG. 2. This injection molding of plastic 80 may take place in a fixture constructed to hold both the housing 12 and the rack tube 22 in a selected relationship until plastic 80 is cured to the point of holding the forces developed in spring 70 transferred by the pinion to the rack and the rack tube.

A further important feature of this invention resides in the accommodation of the described structural assembly to minor endwise or axial adjustment of the relationship of tube 22 within housing 12. Thus, after a final assembly of the various parts into the configuration seen in the drawings, it may be necessary to slightly relocate, prior to injection molding, rack tube 22 relative to the axis of the pinion shaft, this to insure that equal amounts of travel are permitted the rack either side of a centered condition up to bumpers 36. The width of the grooves 76 and 78 permits such minor adjustment since they may be juxtaposed with only a portion of one groove facing a portion of the other and only to the extent required for communication of plastic thereto during molding and of sufficient thickness of plastic to hold axial forces between the parts without fracture. This may be better understood with reference to a preferred assembly process sequence. A first step in such process may be the insertion of rack tube 22 within bore 14. Rack 26 is then inserted within tube 22 and the rack and the tube are adjusted lengthwise of the housing, first to generally locate grooves 76 and 78 opposite one another and subsequently to adjust the rack within the tube until generally equal travel is available between each remote end of the rack and its respective bumper 36. If preferred, this latter need only be a coarse adjustment. The pinion subassembly 38 is then next inserted in cross bore 16 including the installation of spring 70, the thrust loading of the cap 56 and the installation of snap riding 50 and cover 66. The pinion shaft is inserted in such angular position that the usual coupling alignment flat 48a, FIG. 1, on the splined end 48 is in a preferred vertical position. The described radial and tiltable adjustment of tube 22 is then performed to obtain precise meshing engagement of gear teeth and preloading in spring 70 as above. A final check may then be made of the amount of travel either side of the rough center position available to rack 26 and, if unequal, fine adjustment may be made by axial relocation of tube 22 with its bumper 36 within the limits of the width or range of juxtaposition of the grooves 76 and 78 and, with the adjusted parts being held in a fixture or the like, plastic 80 may then finally be molded into the passages between the parts and cured. Note will be made that cutouts 24 are purposely larger, as seen in FIG. 2, than the diamter of the midportion of cross bore 16 to accommodate this adjustment of the tube 22 without interference from pinion 40.

Figure 4:
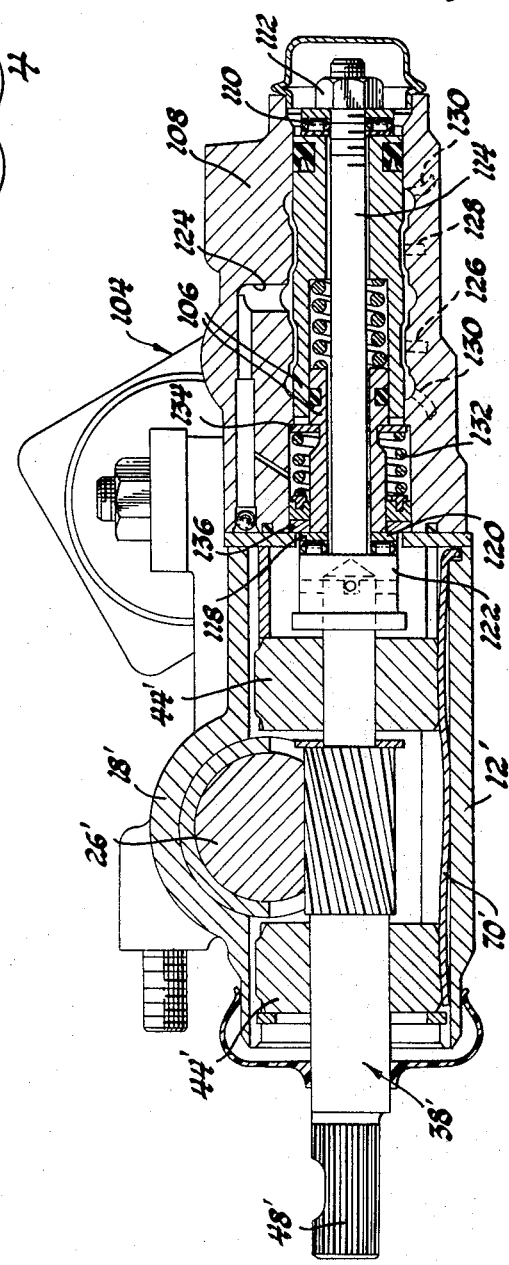
FIG. 4 is an enlarged sectional view taken generally along the plane indicated by lines 4—4 of FIG. 3.

Referring now particularly to FIGS. 3 and 4 of the drawings, a modification of the invention adapted for fluid power operation is shown. The power rack and pinion unit, generally designated 84, includes basically the same manual gear components as in the previous embodiment such being indicated generally at 86, and including the pinion housing 12', the rack tube 22' and the pinion and pinion shaft subassembly indicated at 38'. Here additionally, further showing is made of suitable rubber or like bellows or dust boots 88 which may each be secured at the outer end of rack tube 22 at one end and to the respective ends of the rack 26' at the other end to prevent the entry of foreign matter. Also indicated is the connection by a conventional ball joint or otherwise at 90 of conventional steering linkage to the rack 26. The remote ends of the rack 26 are here indicated at 92 and 94 to show the rigid flange or like structure which may be employed to abut with the bumper 36 on the end of rack tube 22.

In the case of this power operated unit, additional power components are provided in the form of a hydraulic cylinder and piston subassembly 96 having one end of the cylinder 98 attached fixedly to pinion housing 12' and an opposite end of the rod portion of the piston indicated at 100 to a bracket or connector 102 affixed to the rack 26'. Additionally included is a suitable hydraulic four-way valve subassembly 104 for directing fluid pressure to either side of the movable wall, not shown, of piston 100 within cylinder 98. Valve assembly 104, best viewed in FIG. 4, is of the axial spool valve variety including a two-part spool valve member 106 mounted slidably within the bore of valve housing 108 which is bolted or otherwise affixed to pinion housing 12'. Valve member 106 is retained between a roller bearing 110 and nut 112 at one end of an actuating rod 114, and at the other side against a washer 118 bearing at its other side against a further roller bearing 120 backed up by an enlarged end 122 of rod 114. This enlarged end is coupled to rotate as a unit with the inner end of the pinion shaft.

Routing of hydraulic pressure through the valve subassembly to opposite sides of the piston 100 is of generally conventional open-center configuration where incoming pressure fluid delivered from a pump or the like via pressure passage 124 will, in the neutral condition of the valve shown, communicate to both sides of the piston via chamber passages 126 and 128 respectively, and also back to the usual fluid sump via return passages 130, all indicated in broken lines. As is well understood in the art, axial displacement of the valve member 106 in either direction progressively cuts off the supply of pressure fluid from passage 124 to one of the piston sides while building up pressure in the other thereof due to restriction from open passage through one of the return conduits 130. Piston 100 is thus caused to actuate rack 26 in a corresponding direction. The motivation of valve member 126 in the appropriate direction for such fluid assist in steering takes place by virtue of axial displacement of the pinion shaft and pinion 38' which arises due to the helical teeth thereon meshing with the complementary teeth of the rack member which is resisted from reciprocation. Accordingly, the end thrust bearing arrangement of the pinion shaft described in the previous embodiment is altered to permit such relatively free and endwise movement of the pinion and pinion shaft.

The endwise movement of the pinion and pinion shaft, the rod 114 and the combined valve member 106 in either direction from the neutral condition shown, is resisted for driver "feel" by a trapped compression spring 132. One end of such spring bears against a washer 134 cooperable with aligned shoulders in housing 108 and a valve member 106 and the other end of the spring seats against a washer 136 cooperable with similar aligned shoulders on the housing and on the washer 118. Movement of the rod 114 and valve member 106 in either direction from the position shown will further compress spring 132 from an initial preloaded compression and subsequent return of the valve member to centered condition is thus effected when the steering maneuver is accomplished, all in well-known manner.

Suitable communication of the actuating fluid pressure to either side of the movable wall of piston 100 through passages 126 and 128 may be done with the use of connecting pipes 138 shown in FIG. 3, or alternatively by integrally formed passages as may be found convenient within a more integrated unit comprised of the piston and cylinder and the valve housing 108, all as known in the art.

Having thus described the invention, what is claimed is:

1. Rack and pinion steering gear for automotive vehicles comprising, a housing having a longitudinal bore of a diameter and a cross bore, a rack guide tube received in said longitudinal bore having an outer diameter so-related to that of said longitudinal bore as to permit predetermined limited bodily adjusting movement of said tube within said bore in directions both radially and tiltably relative to the axis of the latter, injection molding passage means defined in said housing and said tube, a rack received reciprocably within said guide tube, pinion and pinion shaft means received rotatably within said cross bore and meshingly associated with said rack so that rotation of said pinion and pinion shaft means effects reciprocation of the latter and conversely, and in situ injection molded retaining means within said passage means interconnecting said tube and said housing and holding a radially and tiltably adjusted relationship therebetween.

2. Rack and pinion steering gear for automotive vehicles comprising, a housing having a longitudinal bore of predetermined diameter and a cross bore, a rack guide tube received in said longitudinal bore having an outer diameter so-related to thatof said longitudinal bore as to permit predetermined limited bodily adjusting movement of said tube within said bore radially relative to the axis of the latter, injection molding passage means defined in said housing and said tube, a rack received reciprocably within said guide tube, pinion and pinion shaft means received rotatably within said cross bore and meshingly associated with said rack so that rotation of said pinion and pinion shaft means effects reciprocation of the latter and conversely, preloading spring means seated between said housing and said pinion and pinion shaft means responsive to radial adjustment of said rack tube within said longitudinal bore to exert varying degrees of resilient meshing preload between said rack and said pinion and pinion shaft means, and in situ injection molded retaining means within said passage means interconnecting said tube and said housing and holding a radially adjusted relationship therebetween.

3. Rack and pinion steering gear for automotive vehicles comprising, a housing having a longitudinal bore and a cross bore, a rack guide tube received for slidable adjustment within said longitudinal housing bore, injection molding passage means in said housing of a limited width communicating with said bore, complementary injection molding passage means in the outer surface of said rack guide tube of a width adapted for juxtaposition of at least a portion thereof with said housing passage means over a selected limited range of relatively axially displaced positions between said housing and said tube, a rack member reciprocably received within said rack tube, pinion and pinion shaft means received rotatably within said cross bore and meshingly engaged with said rack so that rotation of said pinion and pinion shaft means will effect reciprocation of the latter and conversely, and in situ molded retaining means within said juxtaposed passage means in said housing and said tube holding a selected axially displaced relationship therebetween.

4. Rack and pinion steering gear for automotive vehicles comprising, a housing having a longitudinal bore of predetermined diameter and a cross bore aligned in generally orthogonal planes of said housing, a rack guide tube received slidably in said longitudinal bore and having an outer diameter so related to the diameter of such bore as to permit predetermined limited bodily movement of said tube within such bore in directions radially of the axis of the latter and also tiltably therewithin to effect skewing adjustment between the axis thereof, injection molding passage means in said housing of a limited width communicating with the longitudinal bore thereof, injection molding passage means in the outer surface of said rack tube of a width selected for juxtaposition of at least a portion of such width with said housing passage means over a predetermined range of axially slidably displaced positions between said housing and said tube, a rack received reciprocably with said tube, pinion and pinion shaft means received rotatably within said cross bore of said housing and meshingly associated with said rack so that rotation of said pinion and pinion shaft means will effect reciprocation of the latter and conversely, and in situ molded retaining means within said juxtaposed passage means of said housing and said tube holding a selected axial, radial and skew adjusted interrelationship between said housing and said tube.

5. Rack and pinion steering gear for automotive vehicles comprising, a housing having a longitudinal bore of predetermined diameter and a cross bore, a rack guide tube received in said longitudinal bore having an outer diameter so-related to that of said longitudinal bore as to permit predetermined limited bodily adjusting movement of said tube within said bore radially relative to the axis of the latter, a rack received reciprocably within said guide tube, a pair of shaft bushings mounted in said cross bore in axially spaced relation and for limited radial movement therein, pinion and pinion shaft means received rotatably within said bushings and meshingly associated with said rack so that rotation of said pinion and pinion shaft means effects reciprocation of the latter and conversely, and bowed blade spring means in said housing having a midportion seated on the latter and end portions each seated on a respective said bushing, said spring means being responsive to said radial adjustment of said tube to flex about said midportion thereof and effect variable degrees of meshing preload between said rack and said pinion and pinion shaft means.

6. Rack and pinion steering gear for automotive vehicles comprising, a housing having a longitudinal bore of predetermined diameter and a cross bore aligned in generally orthogonal planes of said housing, a rack guide tube received slidably in said longitudinal bore and having an outer diameter so related to the diameter of such bore as to permit predetermined limited bodily movement of said tube within such bore in directions both radially of the axis of the latter and tiltably therewithin to effect skewing adjustment between the axes thereof, injection molding passage means in said housing of a limited width communicating with the longitudinal bore thereof, injection molding passage means in the outer surface of said rack tube of a width selected for juxtaposition of at least a portion of such width with said housing passage means over a predetermined range of axially slidably displaced interrelationships between said housing and tube, a rack received reciprocably within said tube, a limitedly radially movable pair of shaft bushings mounted in said cross bore in axially spaced relation, pinion and pinion shaft means received rotatably within said bushings and meshingly associated with said rack so that rotation of the said pinion and pinion shaft means will effect reciprocation of the latter and conversely, bowed blade spring means in said housing having a midportion seated on the latter and end portions each seated on a respective said bushing, said spring means being responsive to said radial adjustment of said tube transferred through corresponding motion of said bushings and pinion and pinion shaft means to exert varying degrees of resilient tooth meshing preload force between said rack and said pinion and pinion shaft means, and in situ molded retaining means within said juxtaposed passage means of said housing and said tube holding a selected axial, radial and skew adjusted interrelationship between said housing and said tube.

7. In a method of assembling a rack and pinion steering gear of a type including a housing having a longitudinal rack bore and a cross bore for a pinion shaft, further including a rack guide tube receivable within the housing longitudinal bore and in turn receiving a rack member slidable therewithin, said housing and said rack guide tube being provided with injection molding passage means for effecting retention of a selected interrelationship between said housing and said tube, the steps comprising, inserting said rack tube within said longitudinal bore of said housing and said rack member within said tube, adjusting the position of said rack member axially of said tube relative to said cross bore so as to effect a generally equal amount of available reciprocation of said rack relative to said tube from said adjusted position in either direction therefrom, inserting a pinion and pinion shaft assembly within said cross bore and into meshing engagement with said rack in the adjusted position of the latter, adjusting said rack tube within the longitudinal bore of said housing in directions both radially and tiltably therewithin for adjusting the meshing relation between the pinion and the rack, and injecting in situ moldable material within said housing and rack tube passage means to hold said adjusted relationships of said parts of the gear upon curing thereof.

8. In a method of assembling a rack and pinion steering gear of a type including a housing having a longitudinal rack bore and a cross bore for a pinion shaft, further including a rack guide tube receivable within the housing longitudinal bore and in turn receiving a rack member slidable therewithin, said housing and said rack guide tube being provided with an injection molding passage means for effecting retention of a selected interrelationship between said housing and said tube, the steps comprising, inserting said rack tube within said longitudinal bore of said housing and inserting said rack member within said tube, adjusting the position of said rack member axially of said tube relative to said cross bore so as to coarsely effect a generally equal amount of available reciprocation of said rack relative to said tube from said adjusted position in either direction therefrom, inserting a pinion and pinion shaft assembly within said cross bore and into meshing engagement with said rack in the adjusted position of the latter, adjusting said rack tube within the longitudinal bore of said housing in directions both radially and tiltably therewithin for adjusting the meshing relation between the pinion and the rack axially displacing said tube relative to said rack and said housing to effect a fine adjustment for a fairly precisely equal amount of said available rack reciprocation in either direction, and injecting in situ moldable material within said housing and rack tube passage means to hold said adjusted relationships of said parts of the gear upon curing thereof.

* * * * *